(12) United States Patent
Usadel (10) Patent No.: US 10,634,513 B2
(45) Date of Patent: Apr. 28, 2020

(54) METHOD FOR VISUALLY DISPLAYING THE POSITIONS OF SELECTED DESTINATIONS IN MAPS IN AN ALTERED MANNER

(71) Applicant: Usadel GmbH, Cologne (DE)

(72) Inventor: Jan Usadel, Cologne (DE)

(73) Assignee: Usadel GmbH, Cologne (DE)

( * ) Notice: Subject to any disclaimer, the term of this patent is extended or adjusted under 35 U.S.C. 154(b) by 117 days.

(21) Appl. No.: 15/768,876

(22) PCT Filed: Oct. 19, 2016

(86) PCT No.: PCT/EP2016/075105
§ 371 (c)(1),
(2) Date: Apr. 17, 2018

(87) PCT Pub. No.: WO2017/067990
PCT Pub. Date: Apr. 27, 2017

(65) Prior Publication Data
US 2019/0154460 A1 May 23, 2019

(30) Foreign Application Priority Data
Oct. 19, 2015 (DE) .......................... 10 2015 117 792

(51) Int. Cl.
*G01C 21/20* (2006.01)
*G01C 21/36* (2006.01)
(Continued)

(52) U.S. Cl.
CPC ..... *G01C 21/3667* (2013.01); *G01C 21/3453* (2013.01); *G01C 21/3614* (2013.01); *G06F 16/29* (2019.01)

(58) Field of Classification Search
CPC ............ G01C 21/3667; G01C 21/3453; G01C 21/3614; G06F 16/29
(Continued)

(56) References Cited

U.S. PATENT DOCUMENTS

2008/0177462 A1   7/2008 Yoshioka et al.
2012/0004840 A1   1/2012 Lee et al.
(Continued)

FOREIGN PATENT DOCUMENTS

DE   10046000   5/2001
EP    1926074   5/2008
(Continued)

OTHER PUBLICATIONS

Internationaler Recherchenbericht and Schriftlicher Bescheid [International Search Report and the Written Opinion] dated Feb. 15, 2017 From the International Searching Authority Re. Application No. PCT/EP2016/075105 and Its Translation of Search Report Into English. (15 pages).

(Continued)

*Primary Examiner* — Thomas G Black
*Assistant Examiner* — Wae L Louie (57) ABSTRACT

The method for displaying a starting point (1) and several destination locations (3) on a screen comprises the following steps:
- selecting a starting point (1) on a location-based representation, and representing the starting point as such on the screen;
- selecting several destination locations (3) and representing them as destination symbols in the location-based representation on the screen,
- setting a selection criterion for reaching the destination locations (3) starting from the starting point (1),
- calculating the position of the destination locations (3) in a time-based representation in accordance with the distance from the starting point and taking into account the selection criterion,
- displaying the destination locations (3) on the screen as destination symbols in the time-based representation, (Continued)

wherein the location-based representation still remains visible on the screen, the time-based representation being centered around the starting symbol, and the distance of the destination symbols in the time-based representation from the starting symbol being a function of the selection criterion, and displaying a relationship between the position of at least one of the individual destination symbols in the location-based representation and the associated destination symbol in the time-based representation.

11 Claims, 10 Drawing Sheets

(51) Int. Cl.
  *G06F 16/29* (2019.01)
  *G01C 21/34* (2006.01)
(58) Field of Classification Search
  USPC .......................................... 701/454, 487, 41
  See application file for complete search history.

(56) References Cited

U.S. PATENT DOCUMENTS

| | | | |
|---|---|---|---|
| 2012/0046821 A1* | 2/2012 | Pettersson | A61G 5/04 701/25 |
| 2015/0330803 A1* | 11/2015 | Okuda | G01C 21/20 701/487 |
| 2015/0330804 A1* | 11/2015 | Okuda | G01C 21/203 701/487 |
| 2019/0154460 A1* | 5/2019 | Usadel | G01C 21/3614 |

FOREIGN PATENT DOCUMENTS

| | | |
|---|---|---|
| JP | 2005-221486 | 8/2005 |
| JP | 2005-326210 | 11/2005 |

OTHER PUBLICATIONS

Mitteilung Gemäß Artikel 94(3) EPÜ [Communication Pursuant to Article 94(3) EPC] dated Jul. 11, 2019 From the European Patent Office Re. Application No. 16791332.6. (8 pages).

* cited by examiner

METHOD FOR VISUALLY DISPLAYING THE POSITIONS OF SELECTED DESTINATIONS IN MAPS IN AN ALTERED MANNER

RELATED APPLICATIONS

This application is a National Phase of PCT Patent Application No. PCT/EP2016/075105 having International filing date of Oct. 19, 2016, which claims the benefit of priority of German Patent Application No. 10 2015 117 792.7 filed on Oct. 19, 2015. The contents of the above applications are all incorporated by reference as if fully set forth herein in their entirety.

FIELD AND BACKGROUND OF THE INVENTION

The invention relates to a method for the electronically modified pictorial representation of positions of locations of selected destination points in geographical maps.

The representation to scale of distances of locations in maps, particularly in road maps, with other topographical conditions is known. Road maps are generally used and comprehensible as information graphics. Road maps serve for the visual information about positions of locations. The contents are uniformly based on a map scale. Thus, the user of a road map is able to orient himself by means of various symbols and their arrangement on the road map in order to estimate and plan for distances and the route to a destination point.

Due to the uniformly applicable scale, the displayed symbols representing the location information are presented with the same ratio to the actual distance in space. Classically, such road maps are distributed in a printed form and are used on monitors, as a visual display of the data in vehicular navigation systems, route planners or navigation systems on PCs or mobile devices. The IT-based usage provides the user with the visual presentation of additional information, i.e. primarily the display of his location or starting point and the highlighting of travel routes and other traffic-specific, location-related information, such as traffic obstructions, refueling facilities and an estimated travel time for a selected or proposed travel route.

The representation of the location-related information in an information graphic of this type remains dependent upon the map scale. Therefore, the representation of the distances of locations remains tied to the map scale, and users estimates the position of the location and the travel time to arrive there based on the representation, or he learns the travel time from spoken or visual additional information. The travel time has no influence on the visual representation of the location-related information according to the map scale.

Travel times to other locations with the same distance in space may vary due to traffic routing, traffic situations, the choice of means of transport or other conditions. The display of the true-to-scale location distances may in that case be misleading with respect to the time expenditure necessary for covering the distance. For example, the travel duration for a route that is shorter in space may be longer in time than for a route that is longer in space, even though they are displayed as being closer or more distant in the true-to-scale display and the shorter distance is estimated to be more easily covered than the more distant location.

The travel times and other information, such as travel costs etc. are generally presented only as retrievable additional information. Generally, alphanumerical characters are used for this purpose. An informative alteration of the map representation based on visual perception, which depends on the additional information, does not take place.

The use of a conventionally true-to-scale map provides the user with no purely visually represented information on the time or travel cost expenditure required to reach the locations indicated in the map and about which location distances could be reached with alternative means of transport with the same travel cost expenditure. Navigation systems, route planners and electronic maps are commercially known which indicate routes to a selected destination point in a highlighted manner in accordance with certain criteria, such as the shortest travel time or travel distance, certain road types. Further information, such as travel costs, can be displayed in accordance with the selected means of transport and the travel destination. However, only as text-based additional information.

The visual presentation of information by means of road maps according to the prior art is disadvantageous in that users are unable to immediately estimate the expenditure for reaching certain destination points from the starting point. In the visual map representation, the shortest distance between two locations is perceived to be the travel distance that is the easiest to cover. In the event users wish to orientate themselves by referring to information other than proximity in the map representation, they need to refer to additional information, which slows down the presentation of information. For example, users most frequently have the option, when selecting the travel distance to a certain location, of selecting one of three alternative routes to the selected location. The alternative traffic routings are then displayed highlighted in color, and the travel times are displayed in a legend. In part, the costs for the journey or travel are also shown for this purpose if the navigation system or the route planner provides these data.

Commercially known maps based on a geographical scale thus only insufficiently serve for advantageously and quickly absorbing relevant information, such as travel time.

Other solutions are known in addition to the commercially known solutions for including the factor time in conventional geographical map depictions.

Isochronous map representations are known. Here, the time expenditure required for reaching a destination is shown in different colors within a displayed map. For example, map regions that can be reached with the same time expenditure are each provided with uniform coloring.

Though the representation of the factor travel time in an isochronous map combines the geographical map with a time-based representation by the surfaces and points of the same time-based distance around a starting point being marked with an identical color, this type of representation cannot be directly absorbed by human perception because the color-marked surfaces must first be identified, compared and then assigned to the geographical representation in a search process.

A representation of the travel time around a selected starting point is also known from DE 100 46 000 A1. Here, the representation dispenses with the geographical, conventional representation in favor of a purely time-dependent representation of the destinations around a selected starting point.

Thus, the representation of a purely time-based map as in DE 100 46 000 A1 only serves insufficiently for incorporating the information of the factor travel time around a starting point in an improved manner. The assignment of the obtained information in this purely time-based map lacks a geographical frame of orientation. Users are provided with a number of destination points on a white surface.

The advantage obtained is thus undone again, because the absorption of the destination points now requires a mental effort from the observer, namely, that he must first assign the destination points using further information, such as a conventional geographical map.

From EP 1 56 60 A1, a representation of the factor travel time in an electronic map representation is also known, such that, subsequent to a starting and a destination location along the displayed route, the distinctive elements of the map, such as the representation of location and the road, are represented in a manner distorted in accordance with the factor time. EP 1 56 60 A1 also mentions that the geographical representation of the route and the time-dependent representation of the route are shown simultaneously and in parallel in two windows on the screen in order thus to enable a comparative absorption of the contents shown.

According to EP 1 56 60 A1, it is, however, disadvantageous that the geographical representation of the route and the time-dependent representation of the route are shown simultaneously and in parallel in two windows on the screen in order thus to enable a comparative absorption of the contents shown. However, the representation in two windows is an obstacle to a direct and uniform absorption. In addition, it has the large drawback that this form of display only works if the distortion of the time-based representation, compared to the conventional geographical representation, is only very slight. If, in the case of a passenger vehicle, the possible travel speeds of 20-200 km/h are taken into account, the time-based representation of a region comprising, as in the case of a major city, a motorway tangent, an access road and a traffic-reduced zone, for example, would be subject to such a great distortion with the factor 10 that the time-based map no longer offers any advantageous informational usefulness.

In summary, all solutions according to the prior art are disadvantageous with respect to a significant improvement of the perception of the factor time and other additional information in a geographical map.

SUMMARY OF THE INVENTION

It is an object of the invention to improve the known methods and to indicate a method in which a user is able to directly discern the effort he requires to reach destination locations selected by him based on the starting point, in particular, which travel time he will need.

This object is achieved by means of the method according to claim 1.

According to the method, the location-based representation and the second representation, e.g. the time-based representation, are displayed on the screen jointly and one above the other. The destination location, which is represented by the destination symbol, is identical in the location-based representation and the second representation. The goal is to represent in the second representation those destination locations that are more easily reached due to the selection criterion, e.g. the travel time, with destination symbols that are closer in the location-based representation to the starting symbol than the corresponding destination symbols, and those destination locations that require a greater expenditure farther away from the starting symbols than the associated destination symbols in the location-based representation. Preferably, the product of the distance, i.e. the travel distance between the starting point and a destination location, times expenditure (e.g. travel time, costs, etc.) is to be optimized.

Alternatively, only the expenditure is preferably to be minimized. In the location-based representation, the scale of the topographical map displayed on the screen is preferably constant and does not change with the distance from the starting point.

By displaying the relationship between the position of at least one destination symbol in the location-based representation and the associated destination symbol in the second representation, the user is able to immediately recognize which destination locations are more favorable, e.g. within reach within a certain time, and which are not. Therefore, so-called polar coordinates are advantageous for the second representation. The destination symbol of the second representation advantageously is located on a straight line connecting the common starting symbol and the associated destination symbol in the location-based representation (of the same destination).

In this case, it is advantageous that the starting point in the location-based representation matches the starting point in the second representation. Thus, users need not re-orientate themselves. The second representation is incorporated into the location-based representation; users need not look at another representation and adapt to that.

A location-based representation is understood to be a representation as it can be found on a map and on GPS devices that are currently commercially available. The location-based representation shows a section from a topographical map. The location-based representation is displayed with a linear scale.

Users directly obtain an information on how much expenditure is required to reach the destination location, superimposed on the location-based representation.

A data processing device is understood to be the electronic part of a GPS device, laptop, another computer or the like. The screen is connected to the data processing device and controlled by it. For example, the screen is the screen of a laptop or GPS device. The input unit is connected to the data processing device. It is configured as a keyboard, voice input device or touch-sensitive part of a screen, for example. The selection of the starting point, the selection of several destination locations, the setting of the selection criterion etc. are carried out by means of the input unit.

In an improved version, it is possible to reduce the brightness and/or the information content of one representation in relation to the other, so that the overall representation as a whole is easier to absorb. Thus, the informational content of the location-based representation may be reduced, for example. In particular, this can take place when the destination locations have been selected; then, irrelevant geographical data may be omitted.

The second representation is, in particular, a time-based representation. Preferably, circles with different time intervals, e.g. 10, 20, 30 minutes, are shown on the screen around the destination symbol; this is to show that the destination symbols situated within these circles in the second representation can be reached within the specified time. Other representations are also possible as the second representation, e.g. travel costs, entry fees, traffic situation.

A connection between the two symbols of at least one individual pair of symbols, i.e. a destination symbol in the location-based representation and the associated destination symbol in the second representation, preferably of all pairs of symbols, is indicated. Thus, it is made possible for the user to easily recognize which one of the destination symbols of one representation belongs to a destination symbol in the other representation. The connection can be obtained by showing a connecting line, in particular a straight line, between the symbols of a pair. Other illustrations of the connection are possible, e.g. different coloring, differing symbols for different pairs, etc.

The invention indicated in patent claim 1 is based on avoiding the delays in the presentation of location-based information in road maps when searching and selecting destination locations and, in particular, to present the user of road maps as they are used for being displayed on monitors in IT technology with more information relevant to decisions in a shorter amount of time for destination selection.

This is based on the insight that human perception of the displayed contents of a map is limited. The possibilities of the perception of a human are limited by his physical conditions and determine the speed with which information can be absorbed, on the scale from an immediate absorption up to an absorption that, in order to be ensured, must be preceded by a series of cognitive processes.

For example, looking at an analog watch is a type of representation of time whose perception works directly and immediately for humans, provided that reading an analog watch has been learned once. The immediate perception of the analog time is aided by the closed optical system of the watch, in which the position of the watch hands also results in a directly perceptible image of the time. A correspondingly direct perception is intended with the invention in the area of map searches.

If, as when looking at an analog watch, no further cognitive processes become necessary for perception, or if they are limited to a minimum, absorption takes place quickly, intuitively and immediately. In all other cases, cognitive processes are first required for perception, which render understanding and perception difficult and delay them. Examples for this include the cognitive efforts in comparing two types of maps in different scales or in reading, evaluating and combining numerical additional information added to the pictorial map representation.

The capacity of human perception, the speed and efficiency of absorbing visual representations, are determined by a series of factors.

In the case of perceiving pictorial contents of a map, it is a decisive factor whether it is possible to perceive the map at a single glance or if sight must first be guided to two or more pictorial contents, or whether they also have to be processed in a cognitive process in order to absorb the message of the picture.

In the case of the perception of pictorial contents of a map, another decisive factor is how advantageously the contents shown are adapted to the template of generally known reference patterns of human perception.

Thus, the known, geographical world map with the display of the continents is a generally learned and internalized fundamental view that offers a universal frame of reference to humans. Human beings have also learned to become familiar with the maps of their own countries and regions. This also includes general map elements depicting both existing natural geographical elements, such as seas, rivers and woods, and man-made elements, such as borders, cities and roads. This learned frame of reference forms the basis for physically absorbing the contents of a map and determines the speed with which individual elements of a map can be absorbed.

If this geographical frame of reference is now abandoned by relinquishing the general geometric scale in favor of a, for example, purely time-dependent scale, the perception of the time-based map is unable to refer to any comparable, learned elements of the human mind. Creating a generally learnable time-based frame of reference in the map representation like the one of the generally valid geographical maps is not possible at all, because the time scale is always a relative indication, which changes depending on the flexibly selected starting point and other factors, such as the current traffic situation.

These insights from the psychology of perception are utilized for the solution according to the invention.

The advantages obtained with the invention in particular consist in enabling the user, using a map representation and based on certain criteria that can also be combined with each other, to obtain a pictorial representation of the preferred determination locations in the map, wherein a representation is used that represents the destination points in accordance with criteria other than those of distance depending on the starting point, instead or in addition to the true-to-scale representation of the distances of the selected destination points from the starting point. Here, however, the map representation in accordance with the generally known geographical scale is still, advantageously, not completely abandoned. Rather, for human absorption and perception, it functions as a frame of orientation and reference for the change of position of the selected destinations taking place on the basis of another scale, such as a time scale. Since two or more representations are thus taken into account in a single display, relevant information is visually condensed around an individually selected starting point in a single section of an image or a map, and the information can thus be recognized and absorbed at a single glance. A display of two or more representations in two or more separate map depictions is omitted. In its function as the frame of reference supporting the advantageous perception at the moment of the change of position of selected destinations, the known geographical map can be reduced, image-wise, by selection and reduction to, for example, few distinctive elements.

Thus, the destination points can be arranged in accordance with the preferred criteria, and the user can more easily compare the criteria of the destination points relevant to him. For the display of the time or cost expenditure for reaching the indicated destination points, the user need not refer to text-based indications, but is able to visually compare the expenditures for reaching the destination based on a positionally altered representation of the destinations or their symbols in the display.

A representation different to the geometrical representation is additionally used for the selected destinations, and the destinations are additionally displayed in accordance with at least one second representation without the geometrical scale of the rest of the map being altered. In the case of the selection criterion of time, the representation of the destination is the time required for reaching the destination, in the case of the selection criterion of travel costs, it is the travel costs required for reaching the destination.

Time and costs are two factors or selection criteria fundamentally inherent to any travel with a means of transport to a destination, and are thus of central significance for evaluating and selecting destinations. The choice of means of transport has a decisive influence on the form of the factors time and costs. Even if one does not use a conventional means of transport when traveling to a destination, but rather travels on foot without incurring costs, the latter may be assigned a sum of costs due to material wear or by incurring imputed opportunity costs.

In addition to the means of transport, however, other components are significant for searching the destination and reaching the destination, such as the route to a destination and the destination as such.

Thus, other representations may be displayed that are oriented towards individual, even subjective, attributes or selection criteria, provided they can be transformed into a numerical scale. For example, alternative destinations and also the routes may be perceived as having a different level of attractiveness. This attractiveness can be rated numerically and thus also function as a scale for the representation of reaching the destination.

The method according to the invention allows the user to obtain a selection of different destination locations in accordance with the travel costs or travel times or other selection criteria for different means of transport or combinations thereof based on the visual representation, wherein the location distance is then represented depending on the travel costs and/or travel times. In a possible extended variant, the attractiveness of the destination and/or of the route there is also incorporated in a numerical form and combined in a uniform scale. In addition to the reduced geographical map representation, the user is thus provided, superimposed on this representation, with a single destination point representation in accordance with a uniformly scaled combination of various other representations, such as time-based and/or cost-based representation and/or route attractiveness and/or destination attractiveness (and/or other properties). Here, the user is able to set and individually weight the selection of the factors to be taken into account in accordance with their individual user's preference.

Another advantageous embodiment of the invention consists of pictorially and visually highlighting the properties of the destinations in accordance with their advantageousness. If, for example, the destinations are hotels, then their advantageousness is expressed, for example, by the price, the facilities, the classification and the reviews by hotel guests. These properties may be displayed with a single symbol, such as a circle, individually or in a combined manner or in a combined and weighted manner, wherein the circle expresses the destination and the diameter of the circle the advantageousness of the circle, wherein an increasing circle diameter expresses the increasing advantageousness of the destination. It is another embodiment of the invention that, when searching for different types of destination, such as hotels and sights and restaurants, each type of destination is assigned its own visual symbol in order to be able to distinguish the types of destination from one another at a glance. Since symbols of this type are generally known and their design in a changing size can be intuitively absorbed, this condensed visual representation serves for the quickest perception of the advantageousness of the destination.

Another advantageous embodiment of the invention marks the advantageousness of a route determined for reaching the destination by means of a symbolic, pictorial, visual marking of this route. In this case, for example, the attractiveness of routes is incorporated in a numerical form and the routes are marked correspondingly, by marking them with an increasing intensity of the color or the line as the perceived attractiveness of the routes increase.

Thus, the method according to the invention enables the user to quickly and efficiently find, absorb and evaluate destinations, even if a multitude of destinations and parameters affecting the destinations is provided. In this case, a shift of the visual destination representation about a starting point into the center of the image of the display medium or screen is also advantageous. For example, the expenditure for absorbing the actual time duration for reaching a destination in the case of hotels around a selected starting point is already very high if a high number of available hotels are provided. If the travel costs for reaching the individual hotels are taken into account at the same time, expenditure will continue to rise significantly. If further selection criteria involved in the stay at the hotel, such as the hotel price, the evaluation of the attractiveness of the hotel, the hotel facilities are added, however, the further expenditure does not rise linearly, but disproportionately to exponentially, and cannot be handled anymore from a certain point if further criteria are added. By condensing and visualizing the data in a single map section on a monitor in accordance with the method of the invention, however, the user is able to recognize and absorb the advantageousness of the selected destination, in the exemplary case a hotel, at a single glance.

BRIEF DESCRIPTION OF THE SEVERAL VIEWS OF THE DRAWINGS

Exemplary embodiments of the invention that are not to be understood as limiting will be explained with reference to the drawings and described in more detail below. In this drawing.

DESCRIPTION OF SPECIFIC EMBODIMENTS OF THE INVENTION

For the positionally altered representation, the user first sets a starting point 1. In electronic maps 2, the representation is variable because the starting point 1 may be changed or shifted at any time. It may correspond to the current location or be set in an arbitrary manner. In the case that the representation according to the invention is effected on a pre-printed map 2, typically required locations such as exhibition venues, airports, railway stations, public places, tourist information centers etc. are selected for displaying the starting point 1, where the maps 2 with the altered representation of the destination locations 3 are then typically distributed and used in paper form.

All scale-based types of map qualify as maps 2, i.e. road maps, city maps, hiking maps, etc. Subsequent to determining a starting point 1 and its indication or symbol 4 on the map 2, the destination locations 3 to be displayed and the expenditure criteria 5 are determined.

Destination locations 3 to be displayed may be cities and towns, location-based facilities such as hotels, restaurants, bars, shops, gas stations, museums, sights, playgrounds, utilities etc.

The travel time and the travel costs are particularly suitable as specification of the expenditure criteria or selection criteria 5. However, other criteria 5, such as traffic density, attractiveness of the travel route, attractiveness of the destination etc. may also qualify individually or combined.

Then, the destination locations 3 are displayed in a true-to-scale representation variant 6 on the map 2 by means of highlighting or destination symbols (in the 1st representation) 7. By selecting a second altered representation 8, the positions of the displayed and highlighted destination locations 3 in relation to the selected expenditure criteria 5 are displayed by a second highlighting or destination symbol (in the 2nd representation) 9. For this purpose, the destination locations 3, in relation to the expenditure criterion 5, are shown on a straight line 10 to the starting point 1 either closer 11 to, at the same position 11 or farther away 12 from the starting point 1. Destination locations 3 that can be reached with a lower expenditure than the expenditure corresponding to their true-to-scale position 6 in the location-based representation are correspondingly displayed closer to the starting point 1. Destination locations 3 that can be reached with a greater expenditure are accordingly represented farther away. The distance for the altered representation 8 of the destination location 3 is determined in relation to the selected expenditure criterion 5 or by a combination of several expenditure criteria 5. For better orientation, the distances thus determined are assigned interval steps, so that they can be displayed on the map 2 by means of concentric circular lines 13, with the starting point 1 simultaneously indicating the position of the center of the circle.

In order to present the information concerning the specific expenditure regarding individual destination locations 3, the altered positions of the locations 8 are displayed within the assigned circular intervals 14. In this case, it is advantageous to represent the change of position by means of a connecting line 15 between the true-to-scale position of the location 6 and the expenditure-based position of the location 8, wherein the approach to the starting point 1 and the distancing from the starting point are made intuitively recognizable. For this propose, the connecting line 15 may be continuous or dashed or color-coded, have arrow symbols indicating the direction of change, or have another significant form of representation. The original true-to-scale positions of the location 6 may also be represented in a transparent form or with a different color. For determining the expenditure, the method preferably takes into account all available information concerning traffic conditions, in particular the current traffic situation, weather conditions and other conditions that may affect the selected expenditure criterion 5. While the destination locations 3 arrange themselves based on the expenditure, the geographical true-to-scale map representation 16 visually recedes into the background, for example by means of a limitation to a few distinct geographical orientation elements 17, or by means of a further pictorial and visual reduction.

According to an advantageous embodiment, the change of position of the destination locations 3 subsequent to the selection of the expenditure criterion 5 takes place dynamically, so that the change of position of the destination locations 3, according to the geometrical scale 6 relative to their altered position, takes place as a movement, which is represented on the screen and thus enables the observer to absorb more quickly and effectively the advantageousness of a destination location 3 that was, for example, previously not taken into account. The observer views a short video or another graphical, electronic, visual animation with a duration of, for example, 1 minute at most, if need be 3 minutes at most. Then, he will see the display as in FIG. 7.

According to an advantageous further embodiment, a selection of the available means of travel and transport may take place subsequent to the determination of the starting point 1. The individual selection of the transport means then forms the basis of the calculation of travel costs for the expenditure criterion 5 of travel costs. The selection may be limited to a single means of transport, such as a passenger vehicle, or a combination of different means of transport, such as an airplane, railway, public transport, taxi, bicycle, pedestrian etc. In this case, the combination of the means of transport can advantageously be adapted in accordance with an optimization of the travel costs. The combination of the means of transport is calculated and displayed such that the result is the cheapest total price.

According to another advantageous embodiment, the positionally altered destination locations are indicated with symbols 1, wherein the size of the individual symbol 1 takes into account an advantageousness of the destination locations 3. Different types of destination locations 3 may be labeled with respectively uniform symbols 1.

According to another advantageous embodiment, individual opportunity costs may also be included as an expenditure criterion 5 in addition to taking into account the travel costs of different means of transport. For example, the travel time to a destination defines a time that cannot be used otherwise, and is thus taken into account by means of an individual sum of costs incorporated into the calculation of the total travel costs related to the travel destination.

Another advantageous embodiment enables the positionally altered representation of the destination locations 3 in accordance with an expenditure criterion 5 expanded by the user by further expenditure criteria 5 and other components affecting the destination. Thus, the component of the time-dependent representation of the destination can be taken into account in addition to the representation of the destination based on the travel costs. In one variant, the selected destination locations 3 are displayed in a positionally altered manner in accordance with the travel costs, and in another selectable variant, the destination locations 3 are displayed in a positionally altered manner in accordance with the criterion 5 of time expenditure. For another variant, the user may weight the individual expenditure criteria 5 equally or differently for their combination and thus generate a variant of the positionally altered destination locations 3 in accordance with the combined expenditure criteria 5 in a single representation.

According to another embodiment of the invention, the positionally altered display of the destination locations includes a selection of different types of destination locations 3 and their individual combination, and also the exclusion of individual destination locations 3.

For an improved intuitive perception, another embodiment of the invention provides that the user is enabled to change the position of the starting point 1 and the displayed destination locations 3 including the map 2. Depending on the individual preference, the starting point 1 can be displayed in the center or another location on the screen.

Figure 1:
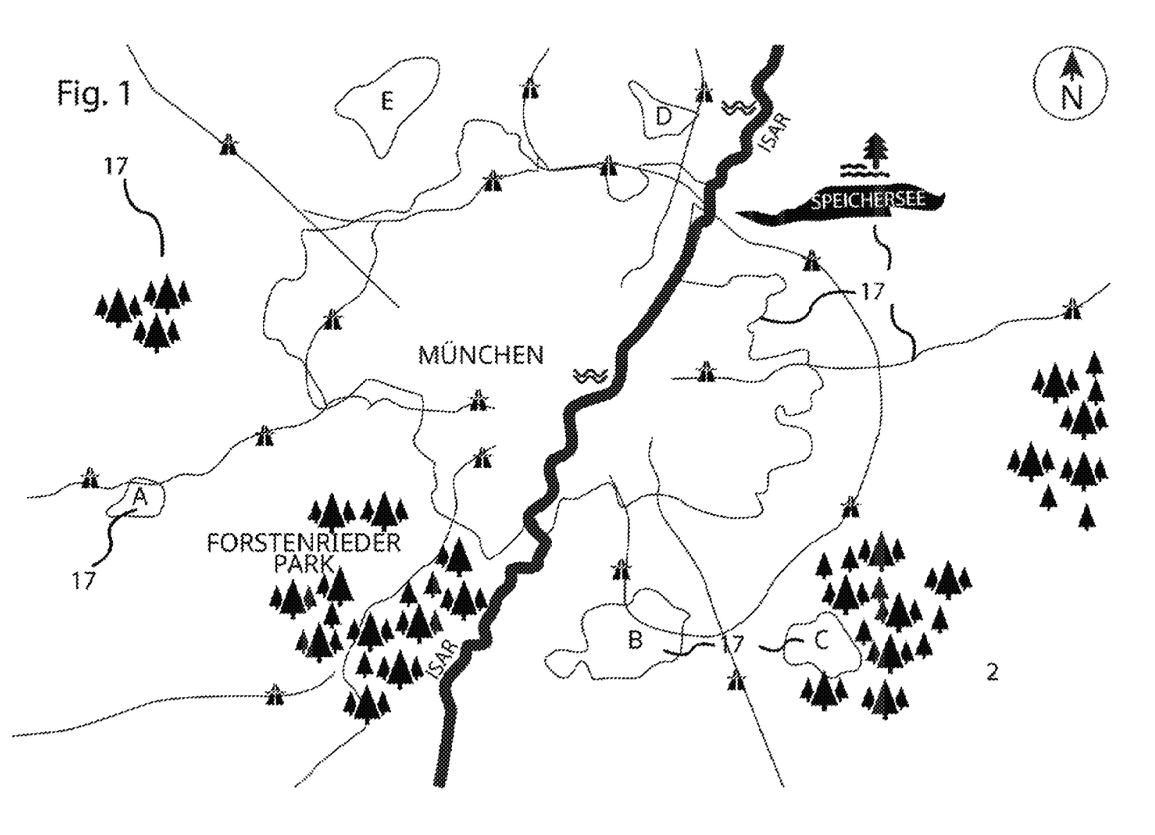
FIG. 1 shows a representation of a topographical map on a screen, München stands for the city of Munic, Forstenrieder Park is a park area, and Speichersee stands for reservoir.

The true-to-scale map 2 shown in FIG. 1 shows the distances between various cities, the position of rivers and lakes, the size of a city and the course and geographical position of the roads as geographical orientation elements 17 to scale. The map 2 in FIG. 1 corresponds to a conventional true-to-scale map 2 that can be read and understood by anybody. The positions of the location are shown to scale. The known kilometer values, converted into a scale, apply. The typical elements of a map 2 are represented by symbols which, depending on the type of map, are explained in an additional legend, but whose depiction was omitted here. Anybody is capable of reading the map and deriving from it that the distances of the locations in space from one another are different, and via which road they could arrive at certain locations.

Figure 2:
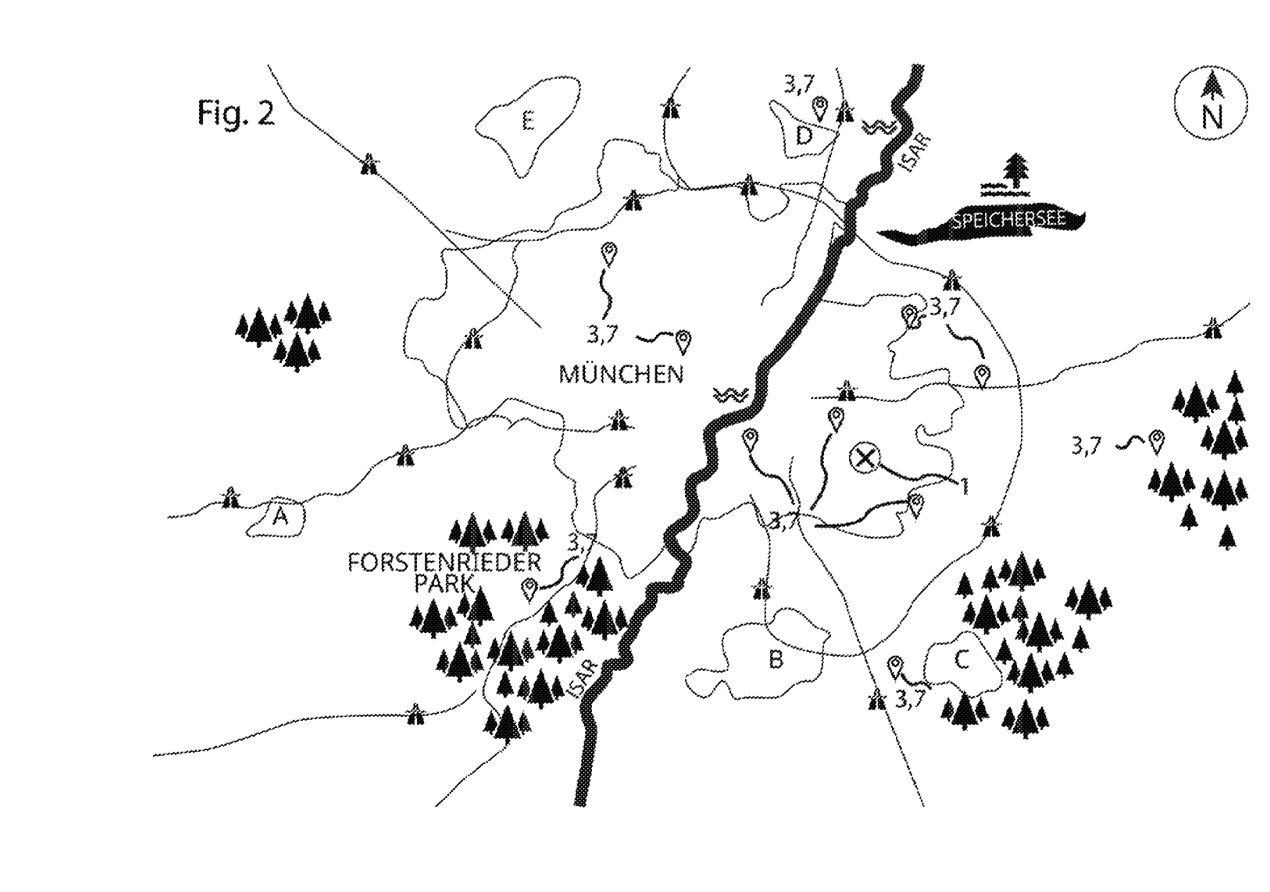
FIG. 2 shows the representation according to FIG. 1, into which a starting point and several destination symbols for the destination locations have been additionally incorporated.

FIG. 2 shows the true-to-scale highlighting 7 of destination locations 3 in map 2. FIG. 2 shows the same map 2 as FIG. 1. The representation is supplemented with a display of the possible destination locations 3 and the display of the starting point 1. The destination locations 3 may be individually selected according to certain criteria, such as locations, sights, hotels, restaurants, etc. They are electronically displayed by means of highlighting 7, and are represented by a drop-shaped symbol in FIG. 2. Their representation in the map corresponds to their actual position in space 12 just as the position of the starting point 1.

Figure 3:
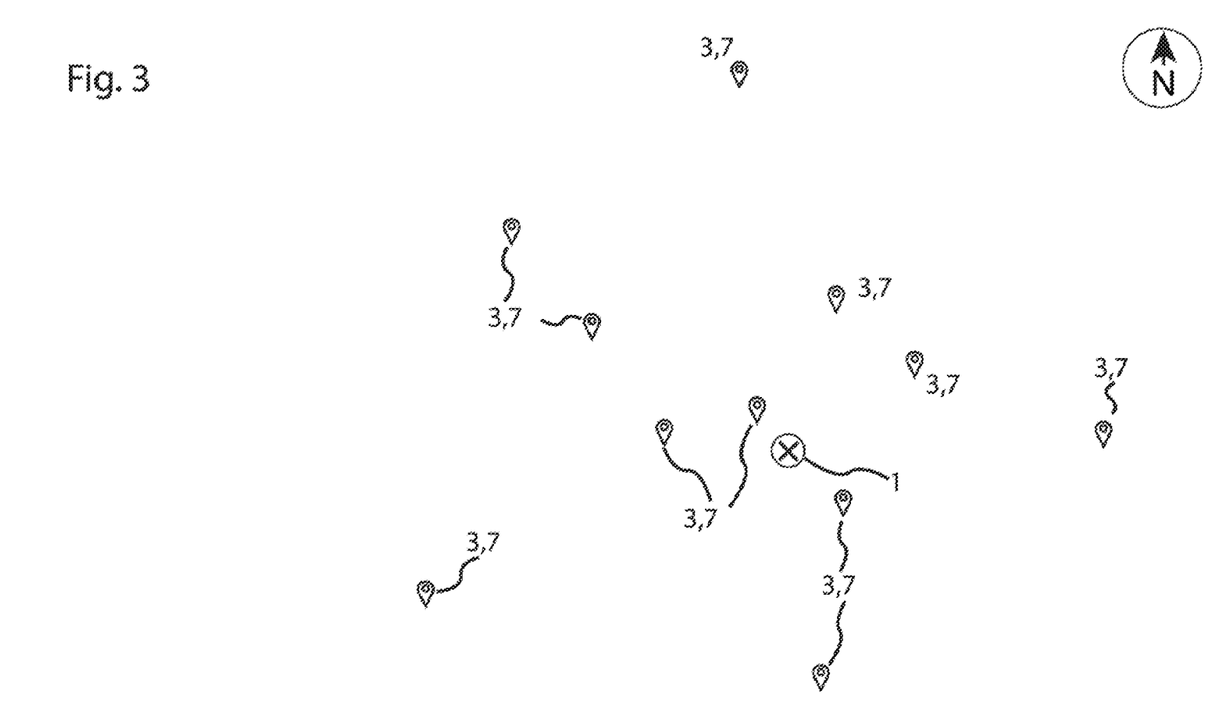
FIG. 3 shows a representation of just the starting point and the destination symbols from FIG. 2.

FIG. 3 shows the true-to-scale highlighting 7 of destination locations 3 without the map 2. FIG. 3 shows the unaltered position of the destination locations and their highlighting 3, 7 and the starting point 1 dissociated from the representation of map 2. The arrangement of the destination locations 3 is not self-explanatory to the observer from this representation. Only an orientation based on the geographical orientation elements 17, as they are typically shown in map 2, would provide any support. The observer, based on the distances between the starting point 1 and the destination location 3, could draw conclusions with regard to the distance that appears different to that from the other destination locations 3. However, this would require a particular interpretation of the representation.

Figure 4:
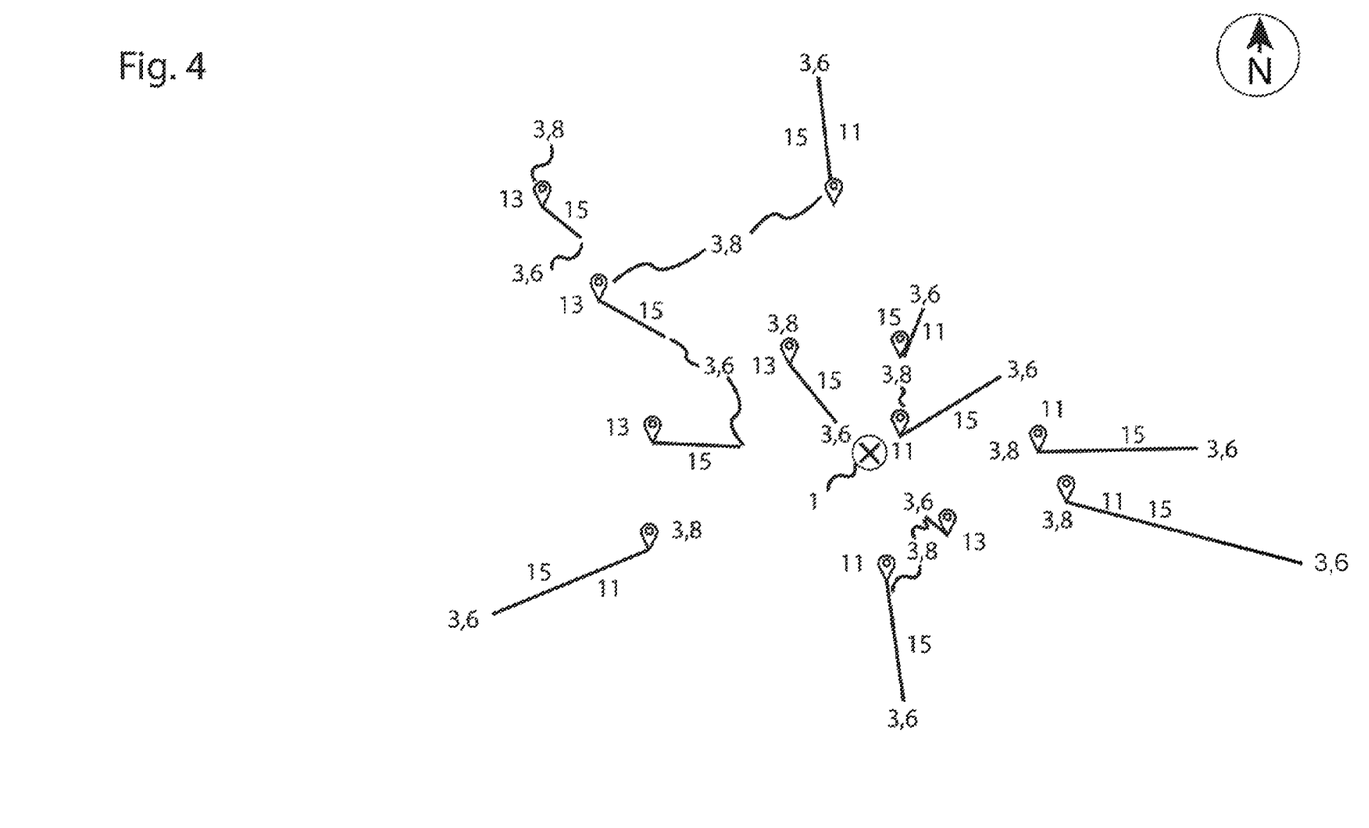
FIG. 4 shows the representation as in FIG. 3 and additionally, in a time-based representation, the position of the destination symbols for the destination locations in the time-based representation, i.e. in accordance with their distance in time from the starting point; in this case, the two destination symbols of each destination in the differing representations are connected to one another by a straight line.

FIG. 4 shows the altered destination locations 8 without a map 2. In FIG. 4, the representation of the destination locations 3, 6 and of the starting point 1 as in FIG. 3 is used to show the change of position of the destination locations 3 calculated from the expenditure criterion 5. Destination locations 3 that, according to the selected expenditure criterion 5, have a more favorable position relative to the starting point 1 are depicted closer 11 to the starting point 1. Destination locations 3 whose position must be rated less favorably according to the selected expenditure criterion 5 are depicted to be more distant 13. The distance of the altered position to the original position 6 is marked by a shift line 15.

Figure 5:
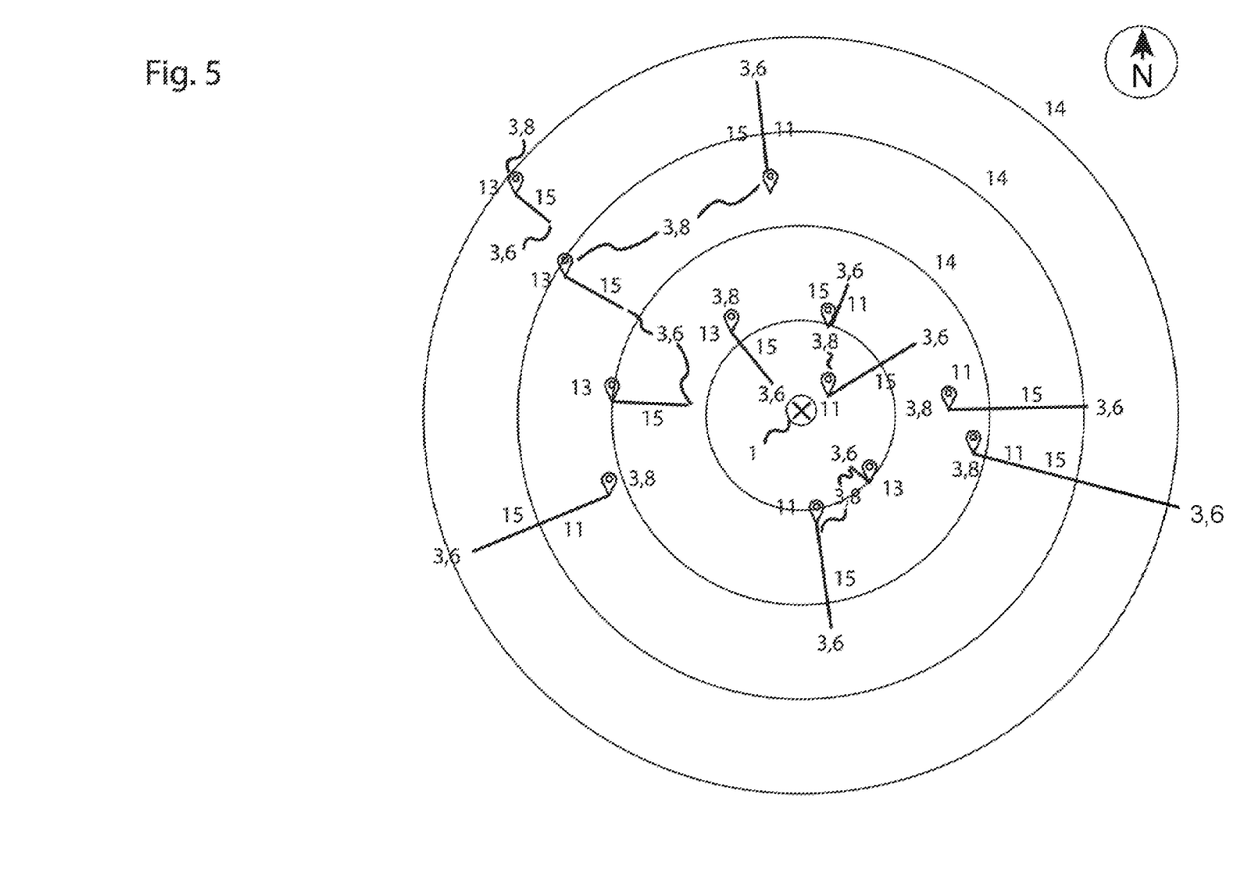
FIG. 5 shows the representation as in FIG. 4; however, circles corresponding to a distance in time from the starting symbol are now additionally drawn around the starting symbol.

FIG. 5 shows the altered destination locations 8 with circular lines 14 without the map 2. FIG. 5 shows everything as described with respect to FIG. 4. The representation is supplemented by the circular lines 14, which facilitates the assignment of one or more destination locations 3 to a certain interval step between the circular lines 14.

Figure 6:
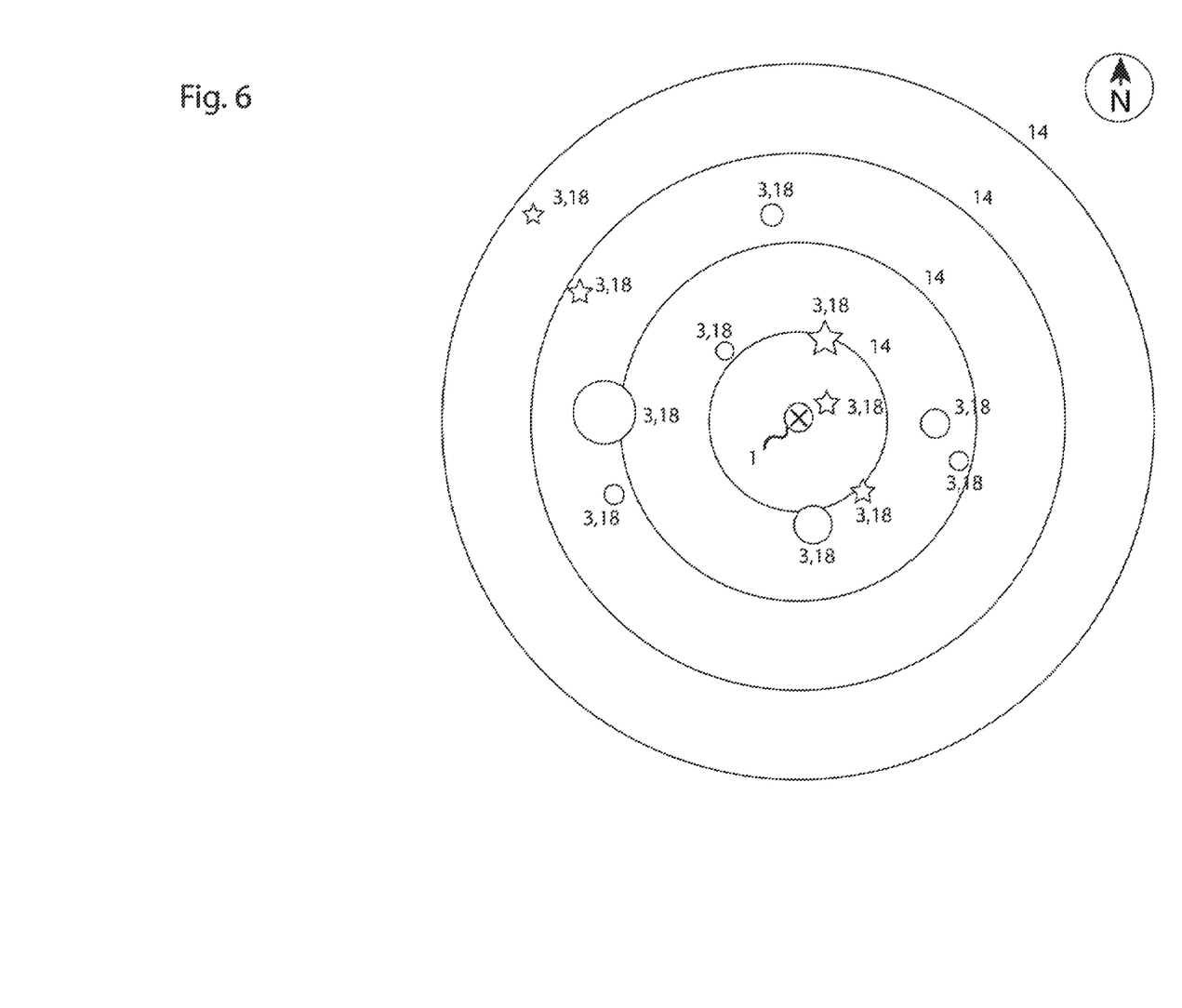
FIG. 6 shows a representation similar to FIG. 5, with altered destination symbols.

FIG. 6 shows the altered destinations with symbols 1. FIG. 6 shows the positionally altered representation of the destination locations. Various symbols 1 identifying the quality and type of destination location 3 are used for highlighting the positionally altered destination locations 3, 9.

Figure 7:
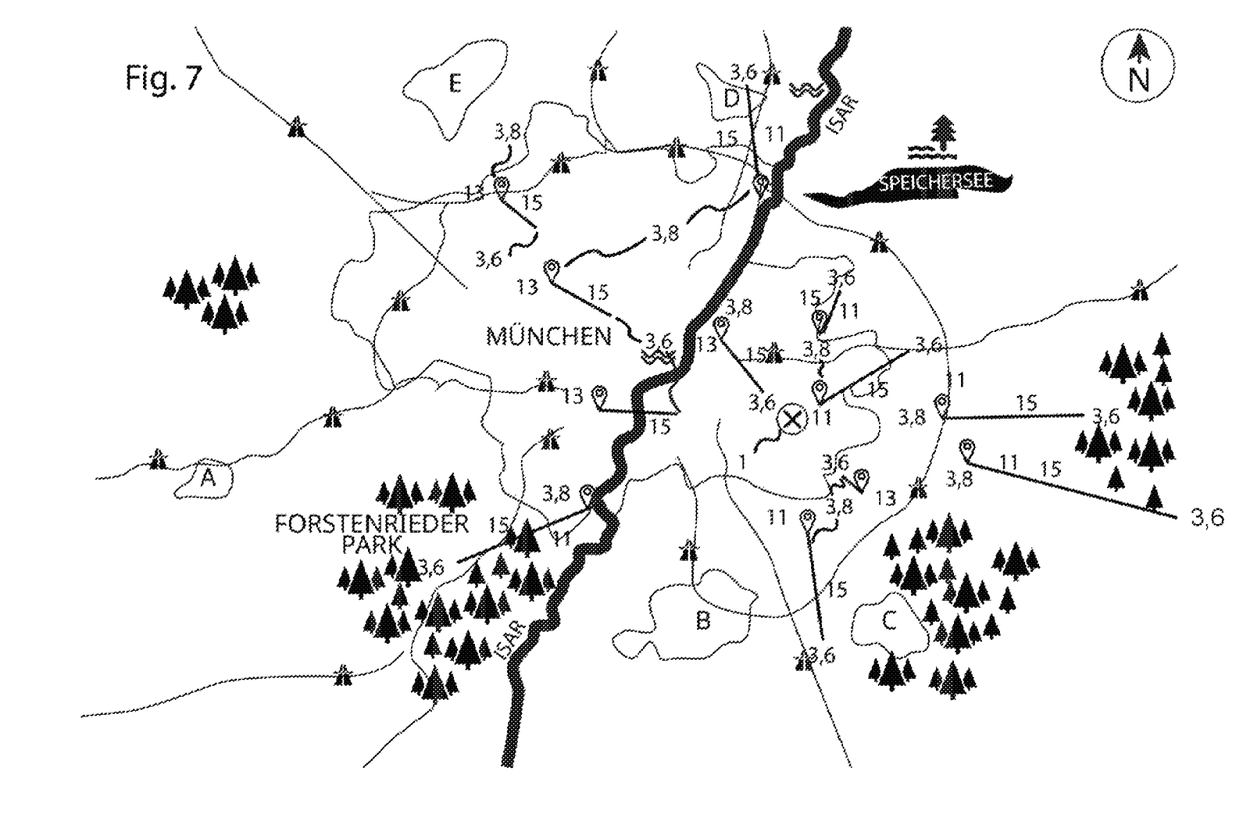
FIG. 7 shows the representation similar to FIG. 1, superimposed on the representation according to FIG. 4.

FIG. 7 shows the altered destination locations 8 with the map 2. Finally, FIG. 7 illustrates a positionally altered representation of the destination location 3, 9 with the shift lines 15 as described with respect to FIG. 4. The representation of the destination locations 3 used in FIG. 4 is superimposed on a map 2 according to FIG. 1 as background, so that the true-to-scale position 6 of the destination locations 3 can be located exactly on the map. The more advantageous destination locations are shifted in the direction of the starting point 1 and, from the logic of the map, can be identified to be closer or more advantageous, whereas the more distant destination locations 3, 13 are understood to be distant and less advantageous.

Figure 8:
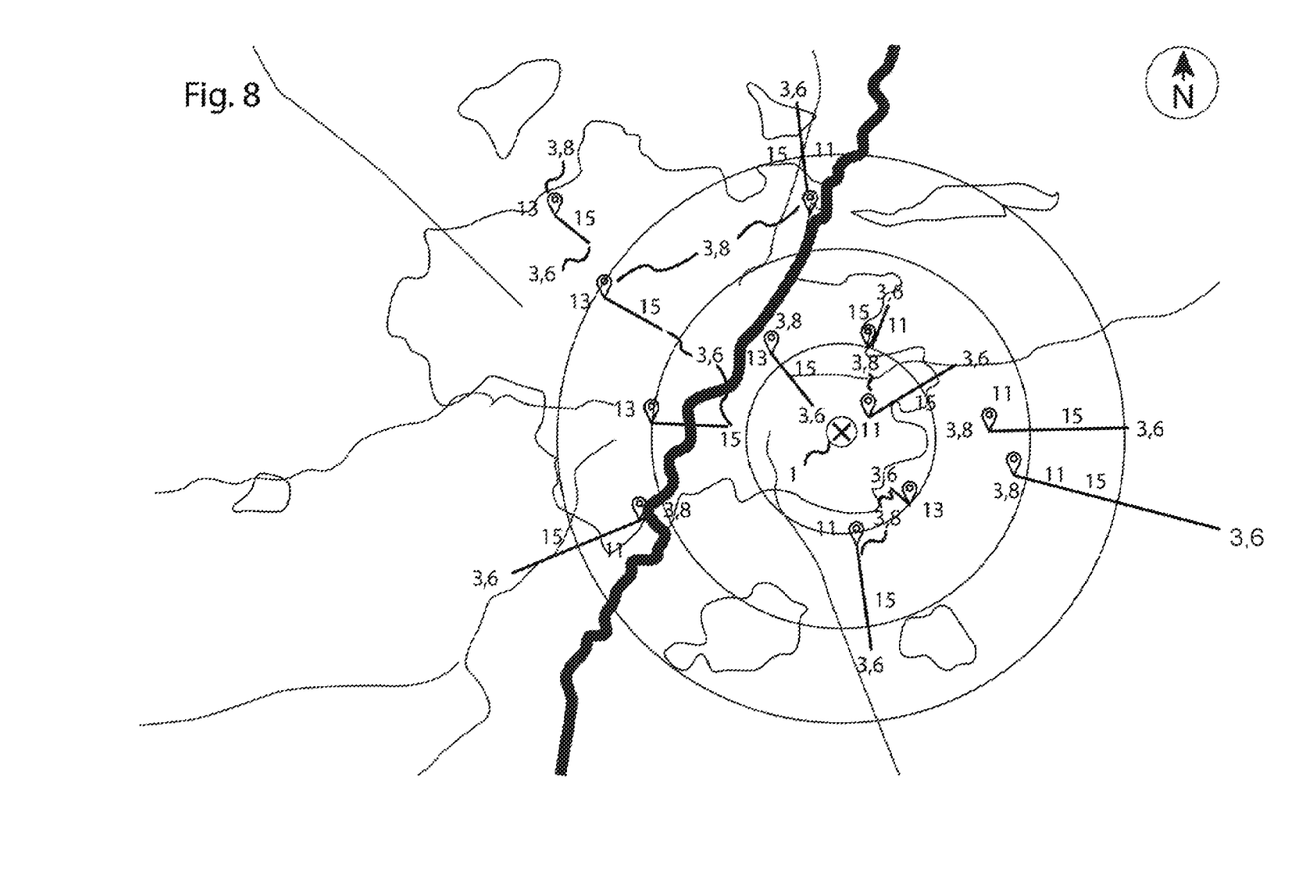
FIG. 8 shows the representation according to FIG. 5 before a representation according to FIG. 1, which forms a pale background and which, in addition, is reduced as regards the content of information.

FIG. 8 shows the map 2 as a background with reduced image information. Fig. is a display of the map 2 according to FIG. 1 as it is used, reduced for visual perception, as a background. The number of geographical orientation elements 17 is reduced, and the image is brightened up for presentation. The altered position of the destination locations 3 and their geographical 3, 6 position with a display of the connecting lines 15 as in FIG. 5 is superimposed thereon.

Figure 9:
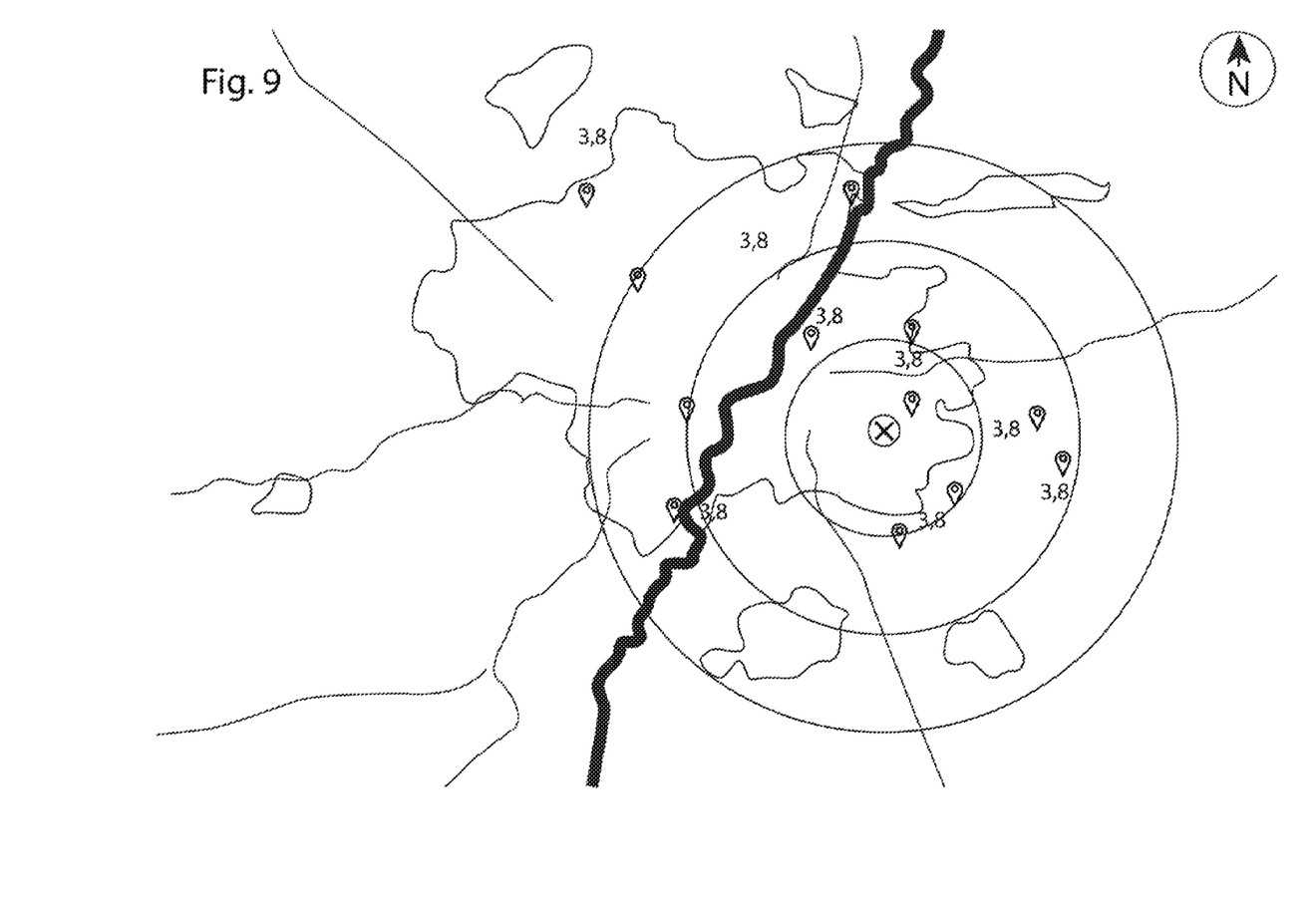
FIG. 9 shows the representation according to FIG. 4 before a representation according to FIG. 1, which forms a pale background and which, in addition, is reduced as regards its content of information.

FIG. 9 corresponds to FIG. 8 with destination locations 3, 8 and circular lines 14.

Similar to Fig., FIG. 9 is a display of the map 2 according to FIG. 1 used, reduced for visual perception, as a background. The number of geographical orientation elements 17 is reduced, and the image is brightened up for presentation. The altered position of the destination locations 3 and a representation of the circular lines 14 is superimposed thereon.

Figure 10:
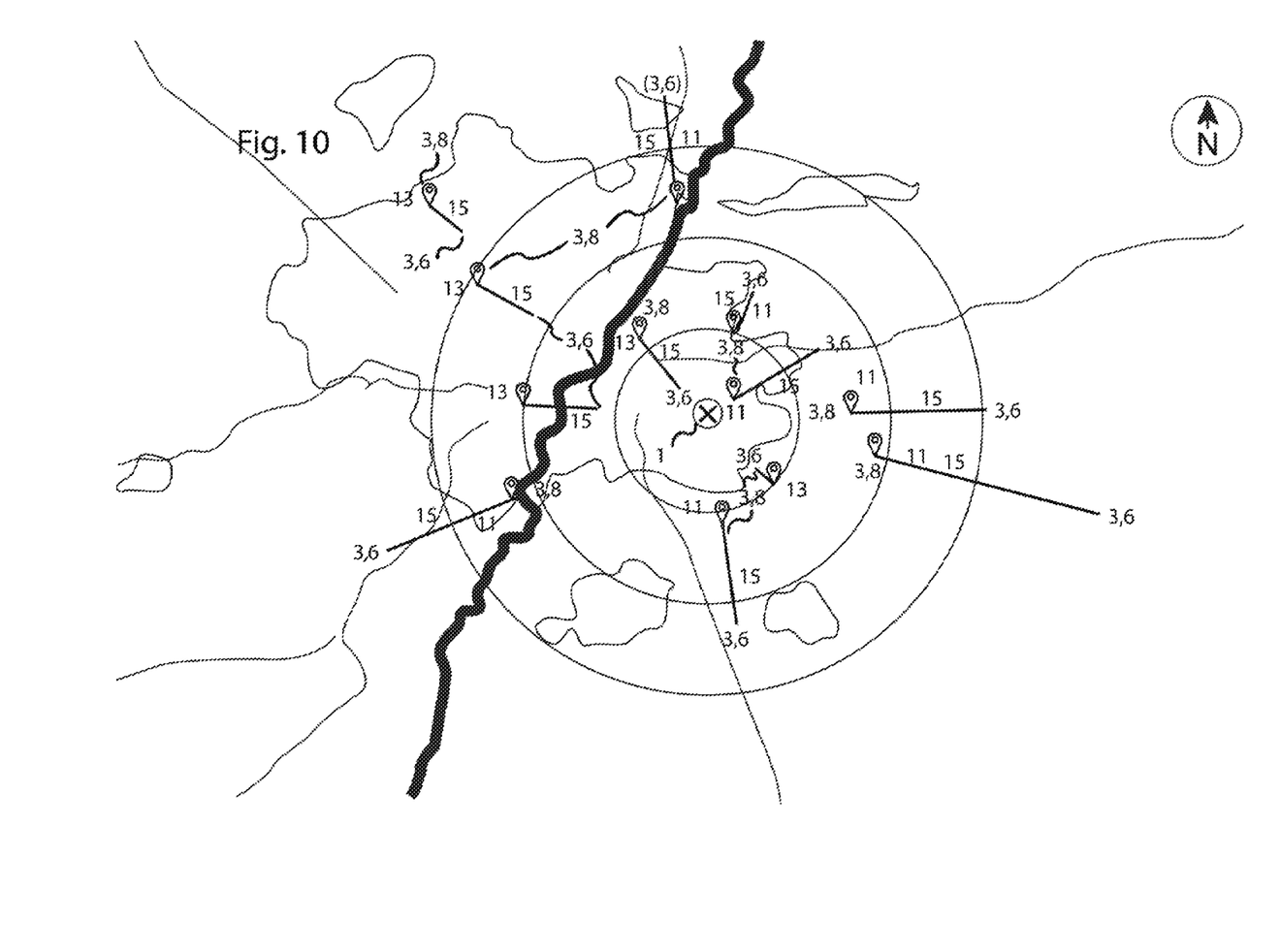
FIG. 10 shows a representation according to Figure before a representation according to FIG. 1, which forms a pale background and which, in addition, is reduced as regards its content of information, and in which the selected starting point is located or centered in the center of the monitor.

FIG. 10 shows the map 2 with the destination locations 3, 8 around a centered starting point 1. FIG. 10 shows Fig., supplemented by the method step of a centered representation of the starting point 1.

In the method for a variable display of certain destination locations 3 in a topographical map 2, the starting point 1 is selected or specified; the latter is shown in the map 2 in a highlighted manner. Preferably, it is displayed in a centered manner on the map 2. In accordance with a specification for the destination locations 3 to be displayed, those positions of the locations matching the destination specifications 6 are also highlighted 7 in the map section used. For the selection of a display of the destination locations 3 in a different map scale to that of the spatial map section, expenditure criteria 5 are selected and, based on information relevant to the location, used as a basis for the altered scale. The altered position of the displayed destination locations 3 determined therefrom is then pictorially represented in accordance with the selected starting point 1 without the geometrical scale of the map 2 being altered in any other way. For representing the altered position in the map 2, the map 2 is preferably brightened, displayed in a blurrier manner, reduced and/or otherwise reduced in informational content. Due to the first initial map being reduced as regards graphics and content, in particular if it is superimposed on the time-based representation, less of a burden is placed on the user. By combining the two maps and the following animation, selection, reduction and finally centering of the two maps, a content is obtained that is easily absorbed.

LIST OF REFERENCE NUMERALS

1 Starting point
2 Map

3 Destination locations
4 Display of starting point, symbol for starting point
5 Expenditure criteria/criterion
6 True-to-scale position of destination location
7 True-to-scale highlighting of destination location or destination symbols (in 1st representation)
8 Altered position of destination location
9 Highlighting of destination location or destination symbols (in 2st representation) based on criteria
10 Straight line to starting point
11 Destination location closer to starting point than in location-based representation
12 Unaltered position of destination location
13 Destination location more distant from starting point than in location-based representation
14 Circular lines
15 Shift line
16 True-to-scale map representation
17 Geographical orientation element
18 Symbols

What is claimed is:

1. A method for displaying a starting point (1) and several destination locations (3) on a screen connected to a data processing device which is connected to an input unit, comprising the following steps:
    selecting a starting point (1) on a location-based representation, which is a section from a topographical map, and representing the starting point in a marked manner as a starting symbol in the location-based representation on the screen;
    selecting several destination locations (3) and representing the individual destination locations (3) in a marked manner as destination symbols in the location-based representation on the screen,
    setting a selection criterion for reaching the destination locations (3) starting from the starting point (1), in particular the travel time, travel costs,
    selecting a second representation which is different to the location-based representation and fits the selection criterion, in particular a time-based representation,
    calculating the position of the destination locations (3) in the second representation in accordance with the distance from the starting point and taking into account the selection criterion,
    displaying the destination locations (3) on the screen as destination symbols in the second representation, wherein the location-based representation still remains visible on the screen, the second representation is centered around the starting symbol, and the distance of the destination symbols in the second representation from the starting symbol is a function of the selection criterion, and
    displaying a relationship between the position of at least one of the individual destination symbols in the location-based representation and the associated destination symbol in the second representation.

2. The method according to claim 1, comprising the additional method step that the altered position (8) of the displayed destination locations (3) is represented by a connecting line (15) between the true-to-scale display of a destination location (6) and the display of the position (8) altered in location in accordance with the selection criterion (5).

3. The method according to claim 1, comprising the additional method step that, subsequent to the selection of the expenditure criterion (5), the travel time or travel costs or other criteria are divided into two or more intervals and represented by circular lines (14) around the starting point (1), wherein the representation of the circular lines (14) and the altered destination locations (8) is based on the same scale.

4. The method according to claim 1, comprising the additional method step that the representation of the change of position of the destination locations (8), to the observer, takes place dynamically, and he is able to visually track the change of position.

5. The method according to claim 1, comprising the additional method step that various means of transport or forms of mobility are available for the selection criterion (5), which are taken into account individually or in combination in the determination of the altered position of the displayed destination locations (8).

6. The method according to claim 1, comprising the additional method step that travel costs, and also costs unrelated to the vehicle, can be additionally determined by the user for the selection criterion (5).

7. The method according to claim 1, comprising the additional method step that more than one selection criterion (5) can be selected, and the altered position of the destination locations (8) are pictorially represented in accordance with each individual selection criterion (5) or in a combination of two or more selection criteria (5).

8. The method according to claim 1, comprising the additional method step that more than one specification for the destination locations (3) to be displayed can be determined and certain destination locations (3) are excluded from being highlighted.

9. The method according to claim 1, comprising the additional method step that the destination locations (8) are highlighted by identical or disparate symbols (1) of an identical or different size that can be associated with an informational content.

10. The method according to claim 1, comprising the additional method step that one or more destination locations (8) can be selected and, subsequent to their being selected, be used for displaying the route also by means of graphical highlighting or other functions.

11. The method according to claim 1, comprising the additional method step that the selected starting point (1), the determined altered position (8) of the destination locations (3) displayed and the representation of the map (2) can be shifted unaltered on the screen of the display medium and the starting point (1) can be represented in a centered manner.

* * * * *